(12) United States Patent
Tagami

(10) Patent No.: US 12,518,784 B1
(45) Date of Patent: Jan. 6, 2026

(54) MAGNETIC DISK DEVICE AND METHOD FOR MANUFACTURING MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 19/068,173

(22) Filed: Mar. 3, 2025

(30) Foreign Application Priority Data

Nov. 13, 2024 (JP) ................. 2024-197814

(51) Int. Cl.
*G11B 5/55* (2006.01)
*G11B 5/74* (2006.01)
*G11B 5/855* (2006.01)

(52) U.S. Cl.
CPC ............. *G11B 5/553* (2013.01); *G11B 5/746* (2013.01); *G11B 5/855* (2013.01); *G11B 2220/2516* (2013.01)

(58) Field of Classification Search
None
See application file for complete search history.

(56) References Cited

U.S. PATENT DOCUMENTS

| 7,068,461 | B1 | 6/2006 | Chue et al. |
| 7,436,611 | B2 | 10/2008 | Nishida et al. |
| 7,898,762 | B1 | 3/2011 | Guo et al. |
| 7,948,708 | B2 * | 5/2011 | Messner ............. G11B 5/012 360/75 |

(Continued)

FOREIGN PATENT DOCUMENTS

JP 2022051394 A 3/2022

*Primary Examiner* — Peter Vincent Agustin
(74) *Attorney, Agent, or Firm* — Maier & Maier, PLLC

(57) ABSTRACT

A magnetic disk device according to an embodiment includes: a magnetic disk including a plurality of tracks; a magnetic head that performs data reading and data writing on the magnetic disk; a plurality of servo regions that is provided in each of the plurality of tracks, and at least partially includes a first physical pattern, the first physical pattern being a physical pattern after writing of a first data pattern including position information of each of the plurality of tracks; and a controller that controls the magnetic head, wherein the plurality of servo regions includes one of a first servo region including the first physical pattern, and a second servo region including a second physical pattern, the second physical pattern being a physical pattern after writing of a second data pattern different from the first data pattern, for each of the plurality of tracks, and the controller performs determination as to which of the first and second physical patterns a third servo region has, the third servo region being one of a servo region among the plurality of servo regions included in the plurality of tracks.

16 Claims, 9 Drawing Sheets

(56) References Cited

U.S. PATENT DOCUMENTS

| | | |
|---|---|---|
| 9,799,360 B2 | 10/2017 | Tagami |
| 11,087,796 B2 | 8/2021 | Tagami |
| 2003/0097523 A1* | 5/2003 | Nobuyoshi ........... G06F 3/0601 |
| | | 711/112 |
| 2019/0237098 A1* | 8/2019 | Asakura ............. G11B 5/59688 |
| 2020/0082848 A1* | 3/2020 | Suzuki ................... G11B 5/012 |
| 2020/0286517 A1* | 9/2020 | Tagami ............ G11B 20/10268 |
| 2022/0093124 A1 | 3/2022 | Kudo |
| 2022/0208225 A1* | 6/2022 | Tagami .............. G11B 5/59655 |

* cited by examiner

FIG.4

| SERVO DATA | DATA PATTERN AFTER CONVERSION |
|---|---|
| 00 → | 0011 0011 |
| 01 → | 0011 1100 |
| 10 → | 1100 0011 |
| 11 → | 1100 1100 |
| | |
| 000 → | 0011 0011 0011 |
| 001 → | 0011 0011 1100 |
| 010 → | 0011 1100 0011 |
| 100 → | 1100 0011 0011 |
| 011 → | 0011 1100 1100 |
| 101 → | 1100 0011 1100 |
| 110 → | 1100 1100 0011 |
| 111 → | 1100 1100 1100 |

\* SERVO DATA 0 → DATA PATTERN AFTER CONVERSION 0011
SERVO DATA 1 → DATA PATTERN AFTER CONVERSION 1100

(Example 1)   ··· 1110 0011 1000 ···

(Example 2)   ··· 0000 0111 1100 0001 1111 ···

(Example 3)   ··· 0000 0011 1111 ···

(Example 4)   ··· 0001 1111 ···

(Example 5)   ··· 1110 0011 1111 ···

MAGNETIC DISK DEVICE AND METHOD FOR MANUFACTURING MAGNETIC DISK DEVICE

CROSS-REFERENCE TO RELATED APPLICATIONS

This application is based upon and claims the benefit of priority from Japanese Patent Application No. 2024-197814, filed on Nov. 13, 2024; the entire contents of which are incorporated herein by reference.

FIELD

Embodiments described herein relate generally to a magnetic disk device and a method for manufacturing the magnetic disk device.

BACKGROUND

In a magnetic disk device, data is read and written by moving a magnetic head to a desired track position among a plurality of tracks provided on a magnetic disk. At this time, the magnetic head is aligned to a desired track according to magnetic head position correction information for each track read from the post code of an individual track.

However, an invalid region in which no post code is recorded may be erroneously read as a post code. In this case, although the reading result of the invalid region having no meaningful information cannot be used as the magnetic head position correction information for each track, the reading result may be determined to be correct and used for alignment of the magnetic head to a desired track.

BRIEF DESCRIPTION OF THE DRAWINGS

FIG. 4 is a diagram illustrating an example of a data pattern included in a post code of the magnetic disk according to the embodiment;

DETAILED DESCRIPTION

A magnetic disk device according to an embodiment includes: a magnetic disk including a plurality of tracks; a magnetic head that performs data reading and data writing on the magnetic disk; a plurality of servo regions that is provided in each of the plurality of tracks, and at least partially includes a first physical pattern, the first physical pattern being a physical pattern after writing of a first data pattern including position information of each of the plurality of tracks; and a controller that controls the magnetic head, wherein the plurality of servo regions includes one of a first servo region including the first physical pattern, and a second servo region including a second physical pattern, the second physical pattern being a physical pattern after writing of a second data pattern different from the first data pattern, for each of the plurality of tracks, and the controller performs determination as to which of the first and second physical patterns a third servo region has, the third servo region being one of a servo region among the plurality of servo regions included in the plurality of tracks.

Hereinafter, an embodiment of the present invention will be described in detail with reference to the drawings. Note that the present invention is not limited by the embodiment described below. In addition, constituent elements in the embodiment described below include those that can be easily assumed by those skilled in the art or those that are substantially the same.

(Configuration Example of Magnetic Disk Device)

Figure 1:
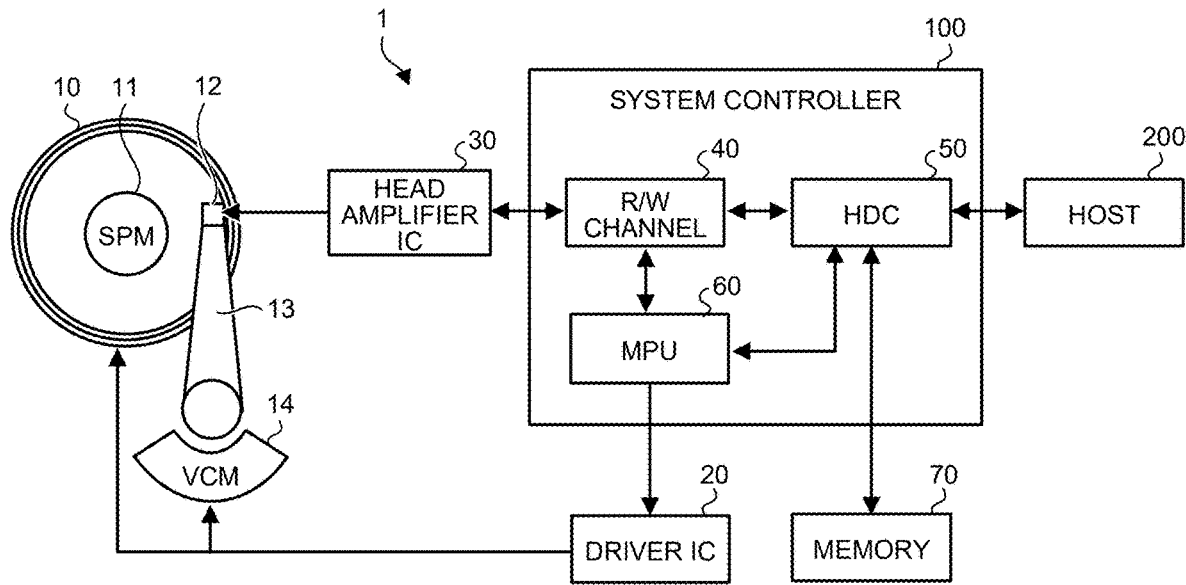
FIG. 1 is a schematic diagram illustrating an example of a configuration of a magnetic disk device according to an embodiment.

FIG. 1 is a schematic diagram illustrating an example of a configuration of a magnetic disk device 1 according to the embodiment. The magnetic disk device 1 of the embodiment is configured as, for example, a hard disk drive (HDD). However, the magnetic disk device 1 of the embodiment may be another magnetic disk device such as a hybrid HDD.

As illustrated in FIG. 1, the magnetic disk device 1 of the embodiment includes a magnetic disk 10, a spindle motor (SPM) 11, a magnetic head 12, an arm 13, a voice coil motor (VCM) 14, a driver integrated circuit (IC) 20, a head amplifier IC 30, a memory 70, and a system controller 100.

The spindle motor 11 holds the magnetic disk 10 and rotates the magnetic disk 10 around a spindle, which is not illustrated. A recording layer capable of recording data is formed in the magnetic disk 10. More specifically, the magnetic disk 10 is provided with a plurality of concentric tracks centered on the rotation center by the spindle motor 11, and data and the like can be written to these tracks.

The magnetic head 12 includes a write head and a read head, which are not illustrated, and is mounted at the tip of the arm 13. When the voice coil motor 14 connected to the other end is driven, the arm 13 moves the magnetic head 12 to a predetermined position of the magnetic disk 10. As a result, the magnetic head 12 can be brought accessibly close to the recording surface of the magnetic disk 10. That is, the magnetic head 12 can thus record (write) data and reproduce (read) data with respect to the recording surface of the magnetic disk 10.

Note that the magnetic disk device 1 may include a plurality of magnetic disks 10 held in parallel in a longitudinal direction of the spindle motor 11, and the recording surfaces of the magnetic disks 10 may be provided on both surfaces of the magnetic disks 10, for example. In this case, the magnetic disk device 1 may include a plurality of magnetic heads 12 such that the number of magnetic heads 12 corresponds to the number of recording surfaces of the magnetic disks 10.

The system controller 100 is achieved by using, for example, a large scale integration (LSI) called a system-on-chip (SoC) in which a plurality of elements is integrated on a single chip. The system controller 100 is connected to a host 200 and controls the entire magnetic disk device 1 based on a command from the host 200. The host 200 is configured as, for example, a processor, a personal computer, or a server.

The system controller 100 includes a read/write (R/W) channel 40, a hard disk controller (HDC) 50, and a micro processor (micro processing unit (MPU)) 60.

The R/W channel 40, the HDC 50, and the MPU 60 are electrically connected to each other, and the system controller 100 is electrically connected to the driver IC 20, the head amplifier IC 30, and the memory 70.

The R/W channel 40 is a signal processing circuit that processes a signal related to reading/writing (read/write). The R/W channel 40 includes a read channel for executing signal processing of read data and a write channel for executing signal processing of write data (both not illustrated). The read channel converts a read signal into digital data and demodulates the read data from the digital data. The write channel encodes the write data transferred from the HDC 50 and transfers the encoded write data to the head amplifier IC 30.

The HDC 50 constitutes an interface between the magnetic disk device 1 and the host 200, and executes transfer control of the read data and the write data. That is, the HDC 50 functions as a host interface controller that transmits and receives signals to and from the host 200. Examples of the signal transferred from the host 200 include commands such as a write command and a read command. The HDC 50 transmits these commands received from the host 200 to the MPU 60.

As described above, in response to various instructions from the host 200, the HDC 50 controls writing of data to the magnetic disk 10 and reading of data from the magnetic disk 10 via the magnetic head 12, the head amplifier IC 30, the R/W channel 40, and the MPU 60.

The MPU 60 is a main controller of the magnetic disk device 1, and executes read/write (R/W) control on firmware. However, the MPU 60 may include a circuit that performs R/W control.

In the R/W control, the MPU 60 controls data write processing and read processing in accordance with a command or the like from the host 200. More specifically, for example, when receiving a write command from the host 200, the MPU 60 executes write processing of writing data to a predetermined region of the magnetic disk 10. In addition, for example, when receiving a read command from the host 200, the MPU 60 executes read processing of reading data from a predetermined region of the magnetic disk 10.

At this time, the MPU 60 controls the voice coil motor 14 via the driver IC 20, positions the magnetic head 12 at a target position of the magnetic disk 10, and executes the write processing or the read processing.

The driver IC 20 controls driving of the spindle motor 11 and the voice coil motor 14 according to control of the MPU 60. When the spindle motor 11 is driven, the magnetic disk 10 held by the spindle motor 11 rotates as described above. When the voice coil motor 14 is driven, the magnetic head 12 is positioned at a target track on the magnetic disk 10.

The head amplifier IC 30 supplies a write signal corresponding to the write data supplied from the R/W channel 40 to the magnetic head 12. In addition, the head amplifier IC 30 amplifies the read signal output from the magnetic head 12 and transmits the amplified read signal to the R/W channel 40.

The memory 70 is configured to include a volatile memory, a nonvolatile memory, and the like. As an example, the memory 70 includes buffer memory including dynamic random access memory (DRAM), and flash memory.

(Configuration Example of Magnetic Disk)

Figure 2:
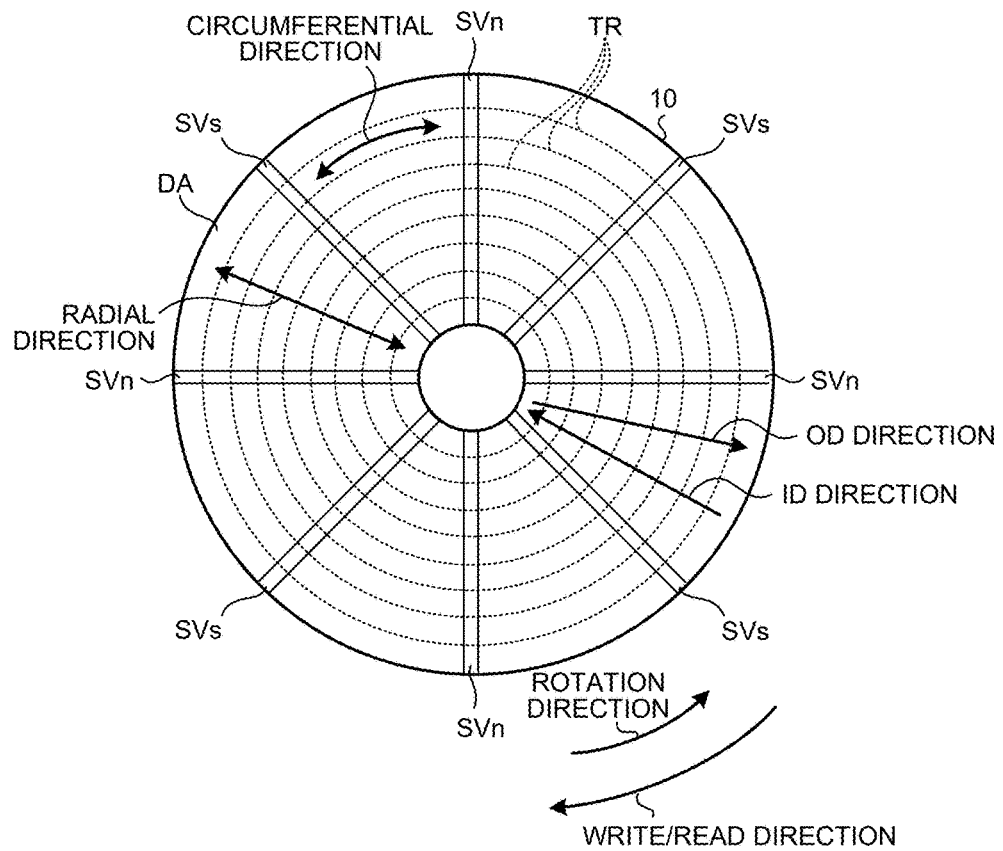
FIG. 2 is a schematic diagram illustrating an example of a configuration of a magnetic disk according to the embodiment.

FIG. 2 is a schematic diagram illustrating an example of a configuration of the magnetic disk 10 according to the embodiment.

As illustrated in FIG. 2, in the magnetic disk 10, a plurality of tracks TR defined by servo data written in advance on the magnetic disk 10 is concentrically arranged. In addition, FIG. 2 illustrates an example of a rotation direction of the magnetic disk 10. However, the rotation direction of the magnetic disk 10 may be opposite to that in the example of FIG. 2.

Note that the magnetic head 12 moves relative to the magnetic disk 10 as the magnetic disk 10 rotates. Accordingly, the write/read direction, that is, the direction in which data is written or read by the magnetic head 12 is along the circumferential direction of the magnetic disk 10 and is opposite to the rotation direction of the magnetic disk 10.

In addition, in a radial direction, a direction from the edge to the center of the magnetic disk 10 may be referred to as an inner diameter (ID) direction, and a direction from the center to the edge of the magnetic disk 10 may be referred to as an outer diameter (OD) direction.

The plurality of tracks TR is provided with a plurality of servo regions SV (SVn and SVs) radially arranged at predetermined intervals in the circumferential direction and a data region DA arranged therebetween.

In at least some of the servo regions SV, servo data used for positioning the magnetic head 12 is written in a manufacturing process of the magnetic disk device 1. At this time, the servo region SV may include the servo region SVn and the servo region SVs according to the amount of written information. The servo region SVn is a region where data of a predetermined information amount is written, and the servo region SVs is a region where data of an information amount equal to or smaller than that of the servo region SVn is written.

As a result, at least one or more servo regions SVs are arranged between two servo regions SVn adjacent in the circumferential direction. In the example of FIG. 2, one servo region SVs is arranged between adjacent servo regions SVn. That is, the servo regions SVn and the servo regions SVs are alternately arranged one by one in the circumferential direction. However, regardless of the example of FIG. 2, the servo region SVn may be arranged instead of the servo region SVs.

The data region DA of the magnetic disk 10 is used for writing user data received from the host 200, metadata such as an error correction code attached to the user data, system data, and the like.

Note that, in the present specification, the track TR on which servo data is written is referred to as a servo track, and the track TR on which user data or the like is written is referred to as a data track, and they may be distinguished from each other.

That is, in the servo data included in the servo region SV described above, the setting of the positional relationship between the plurality of servo tracks and the plurality of data tracks is held in advance. As a result, the magnetic disk device 1 can execute positioning control for positioning the magnetic head 12 on the target data track based on the servo data recorded in an individual servo track. The positioning control includes a seek operation of moving the magnetic head 12 in the radial direction toward a target data track, a tracking operation of maintaining the magnetic head 12 on a target data track, and the like.

Figure 3:
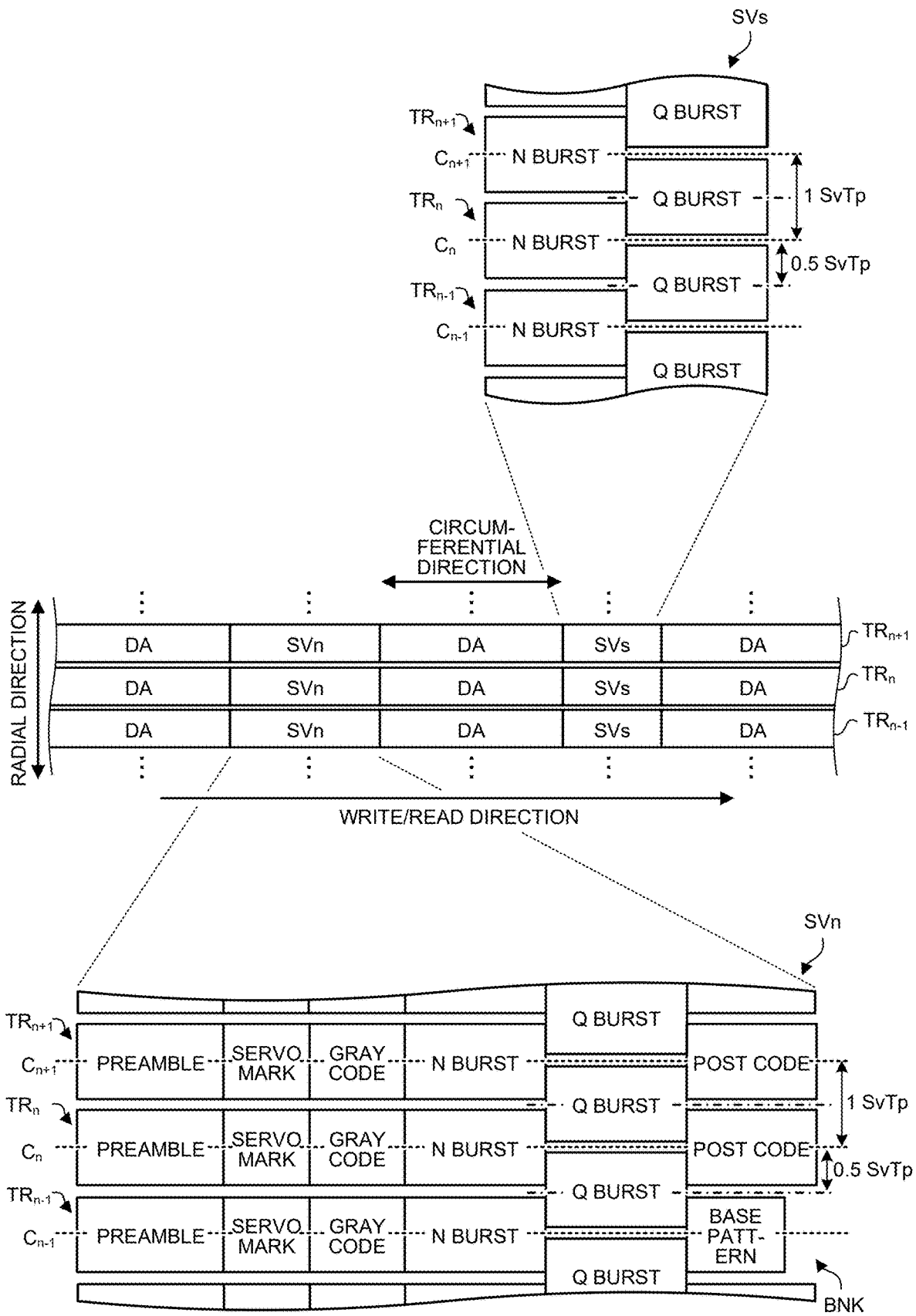
FIG. 3 is a schematic diagram illustrating an example of a state in which servo data is written in a servo region according to the embodiment.

FIG. 3 is a schematic diagram illustrating an example of a state in which servo data is written in the servo region SV according to the embodiment.

FIG. 3 illustrates three tracks $TR_{n-1}$, $TR_n$, and $TR_{n+1}$ adjacent in the radial direction of the magnetic disk 10, and track centers $C_{n-1}$, $C_n$, and $C_{n+1}$ that are center positions of the tracks $TR_{n-1}$, $TR_n$, and $TR_{n+1}$ in the radial direction. In addition, it is assumed that a pitch between the individual tracks $TR_{n-1}$, $TR_n$, and $TR_{n+1}$ is 1 SvTp.

Note that, in FIG. 3, these tracks $TR_{n-1}$, $TR_n$, and $TR_{n+1}$ are illustrated at predetermined intervals in consideration of visibility of the drawing. However, these tracks $TR_{n-1}$, $TR_n$, and $TR_{n+1}$ may be arranged so as to be in contact with each other without an interval.

As illustrated in FIG. 3, in the servo region SVn of an individual track TR, a preamble, a servo mark, a gray code, an N burst, and a Q burst are recorded in this order in the write/read direction, that is, in the circumferential direction of the magnetic disk 10. In addition, in at least some of the tracks TR, a post code is recorded in a region following the Q burst in the write/read direction.

The servo data such as the preamble, the servo mark, the gray code, the N burst, the Q burst, and the post code is recorded such that the start positions and the end positions in the circumferential direction match in the radial direction between the individual tracks TR.

The preamble is pattern data of a single cycle in which a data value periodically changes in the circumferential direction. The magnetic head 12 reads the servo waveform, and the R/W channel 40 captures the read servo waveform as sampling data based on the servo clock. The preamble is used to adjust the amplitude, phase, and frequency of the sampling data.

The servo mark is pattern data for determining a demodulation timing of the servo data. The MPU 60 determines the demodulation timing of various servo data read by the magnetic head 12 thereafter based on the servo mark detection timing.

The gray code is pattern data including an address for identifying each servo track provided on the magnetic disk 10.

The N burst and the Q burst are pattern data used to detect the amount of positional deviation from the track center of the servo track indicated by the address included in the gray code and calculate a position error signal required for track tracking.

More specifically, similarly to the preamble, the servo mark, and the gray code, the N burst is arranged such that the center position in the radial direction matches the track centers $C_{n-1}$, $C_n$, and $C_{n+1}$ of the individual tracks $TR_{n-1}$, $TR_n$, and $TR_{n+1}$. On the other hand, the Q burst is arranged with the center position in the radial direction shifted by 0.5 SvTp with respect to the track centers $C_{n-1}$, $C_n$, and $C_{n+1}$ of the respective individual tracks $TR_{n-1}$, $TR_n$, and $TR_{n+1}$. The N burst and the Q burst are arranged such that the phase of the data pattern is inverted by 180 degrees at 1 SvTp in the radial direction. The fact that the phase of the data pattern is inverted by 180 degrees indicates that, in a case where the write data is binary of "0" and "1", the data pattern is obtained by interchanging "0" and "1".

By configuring the N burst and the Q burst in this manner, the maximum/minimum of the amplitude of the read waveform of the N burst and the maximum/minimum of the amplitude of the read waveform of the Q burst are switched between when the magnetic head 12 passes through the track centers $C_{n-1}$, Ch, and $C_{n+1}$ of the respective individual tracks $TR_{n-1}$, $TR_n$, and $TR_{n+1}$ and when the magnetic head 12 passes through positions offset from the track centers $C_{n-1}$, $C_n$, and $C_{n+1}$ by 0.5 SvTp.

The MPU 60 can detect the amount of positional deviation from the track center of the servo track based on the amplitude and phase of the read waveform of the N burst and the amplitude and phase of the read waveform of the Q burst.

Note that, as described above, since the Q burst is recorded by being shifted by 0.5 SvTp from the track centers $C_{n-1}$, $C_n$, and n+1 of the respective individual tracks $TR_{n-1}$, $TR_n$, and $TR_{n+1}$, the servo data including the preamble, the servo mark, the gray code, the N burst, the Q burst, and the post code has a pitch of 0.5 SvTp in the radial direction.

The post code is pattern data obtained by coding a RRO correction amount. Repeatable Run Out (RRO) is a positional deviation repeatedly generated in synchronization with the rotation of the magnetic disk 10.

Although the shape of the track is ideally a perfect circle, the servo track is distorted due to the vibration received at the time of writing the servo data, the write quality of the servo data, and the like. Therefore, the radial position of the servo track specified by the N burst and the Q burst described above may deviate from the radial position of the servo track having the ideal shape. Such a positional deviation is called RRO since the same amount is repeatedly generated with a cycle of one rotation of the magnetic disk 10.

In the manufacturing process of the magnetic disk device 1, the RRO correction amount is measured for each predetermined servo track and is written as a post code in the corresponding servo region SVn.

The MPU 60 performs correction using the RRO correction amount recorded in the post code on the radial position of the magnetic head 12 obtained by reading the N burst and the Q burst, and acquires the radial position of the magnetic head 12 in which the positional deviation due to the RRO is canceled.

The post code is overwritten on the base pattern written in advance in a region adjacent to the Q burst in the circumferential direction in an individual track TR. In some tracks TR on which the post code has not been written, the base pattern remains without being overwritten. In the example of FIG. 3, among the tracks $TR_{n-1}$, $TR_n$, and $TR_{n+1}$, the post code is recorded on the tracks $TR_{n-1}$ and $TR_n$, and the base pattern remains on the track $TR_{n+1}$.

As described above, the track TR on which the base pattern remains without the post code being written is, for example, an invalid track or the like determined to be unsuitable for writing/reading data in the manufacturing process of the magnetic disk device 1 because of having a defect or the like.

Note that, for example, the base pattern may be written only in a part of the region used for recording the post code in the circumferential direction, may be written in the entire area of the region used for recording the post code in the circumferential direction, or may be written beyond the region used for recording the post code. Accordingly, in the base pattern and the post code, the end positions in the circumferential direction may not match in the radial direction between the individual tracks TR. However, the base pattern and the post code are recorded such that the start positions in the circumferential direction match in the radial direction between the individual tracks TR.

In the example of FIG. 3, the base pattern is written only in a part of the region used for recording the post code in the circumferential direction. In this case, the region following the remaining base pattern may be a blank region BNK in which the predetermined information is not written. That is, the blank region BNK is a region having no meaningful information.

Note that the post code written in the servo region SVn may include a Sync mark indicating the start position of the post code, a parity bit for detecting an error in data such as data bit garbling included in the post code, and the like.

In the servo region SVs of an individual track TR, the N burst and the Q burst are recorded in this order along the write/read direction. That is, the servo region SVs includes the servo data excluding the preamble, the servo mark, the gray code, and the post code from the servo data written in the servo region SVn described above. Therefore, in the servo region SVs, the length in the circumferential direction is shortened as compared with the servo region SVn, and as a result, the amount of user data that can be recorded in the data region DA can be increased.

As described above, since no servo mark is recorded in the servo region SVs, the R/W channel 40 specifies the demodulation timing of various servo data with reference to the timing at which the servo mark is detected when the magnetic head 12 passes over another servo region SVn. However, in addition to the "N burst and the Q burst, an additional pattern for detecting a deviation in demodulation timing may be written in the servo region SVs. In addition, the preamble, the servo mark, and the gray code may be written in the servo region SVs similarly to the servo region SVn.

As described above, the preamble, the servo mark, the gray code, the N burst, the Q burst, and the post code are written in the servo region SVn, and these pieces of data written in the servo region SVn are also referred to as normal servo data. In addition, the N burst and the Q burst are exclusively written in the servo region SVs, and these pieces of data written in the servo region SVs are also referred to as short servo data.

Next, a configuration example of the base pattern included in the magnetic disk 10 according to the embodiment will be described with reference to FIGS. 4 and 5. The post code and the base pattern described above are written with different data patterns.

FIG. 4 is a diagram illustrating an example of a data pattern included in a post code of the magnetic disk 10 according to the embodiment.

1 servo data is represented by, for example, "0" and "1", and when the unit of the write length of the servo data to the magnetic disk 10 is T, the write length of 1 servo data corresponds to 4 T. More specifically, the fundamental frequency of writing and reading of the servo data is set in the R/W channel 40 of the magnetic disk device 1, and when the unit of the fundamental frequency is FreqRWC, 1 T corresponds to a time for one cycle, that is, a time represented by a reciprocal (1/FreqRWC) of the fundamental frequency.

As illustrated in FIG. 4, when 1 servo data is written to the magnetic disk 10, the data is converted into data having a 4 T length. More specifically, the servo data "0" is converted into, for example, "0011", and the servo data "1" is converted into, for example, "1100".

The data included in the post code described above is also represented by a combination of the servo data "0" and the servo data "1". FIG. 4 illustrates an example of a case where 2 servo data such as "00", "01", "10", and "11" are converted into data having an 8 T length and a case where 3 servo data such as "000", "001", "010", "100", "011", "101", "110", and "111" are converted into data having a 12 T length.

Note that, hereinafter, a pattern represented by servo data before being written to the magnetic disk 10 and having "0" and "1" after the data is converted is referred to as a data pattern, and a data pattern that is written to the magnetic disk 10 and physically exists on the magnetic disk 10 is referred to as a physical pattern. In this case, data obtained by reading a physical pattern after being written to the magnetic disk 10 by the magnetic head 12 and before being reconverted into servo data can also be referred to as a data pattern. However, the data after conversion of the servo data before being written to the magnetic disk 10 and the data before conversion of the servo data read by the magnetic head 12 may be distinguished from each other and referred to as servo write data and servo read data, respectively.

Referring to FIG. 4, it can be seen that the post code after conversion is represented by a combination of 2 T or 4 T data patterns of "00", "11", "0000", and "1111".

As described above, the base pattern on which the post code is overwritten has a data pattern different from that of the post code. That is, the base pattern is configured without including a 2 T or 4 T data pattern of "00", "11", "0000", and "1111".

Figure 5:
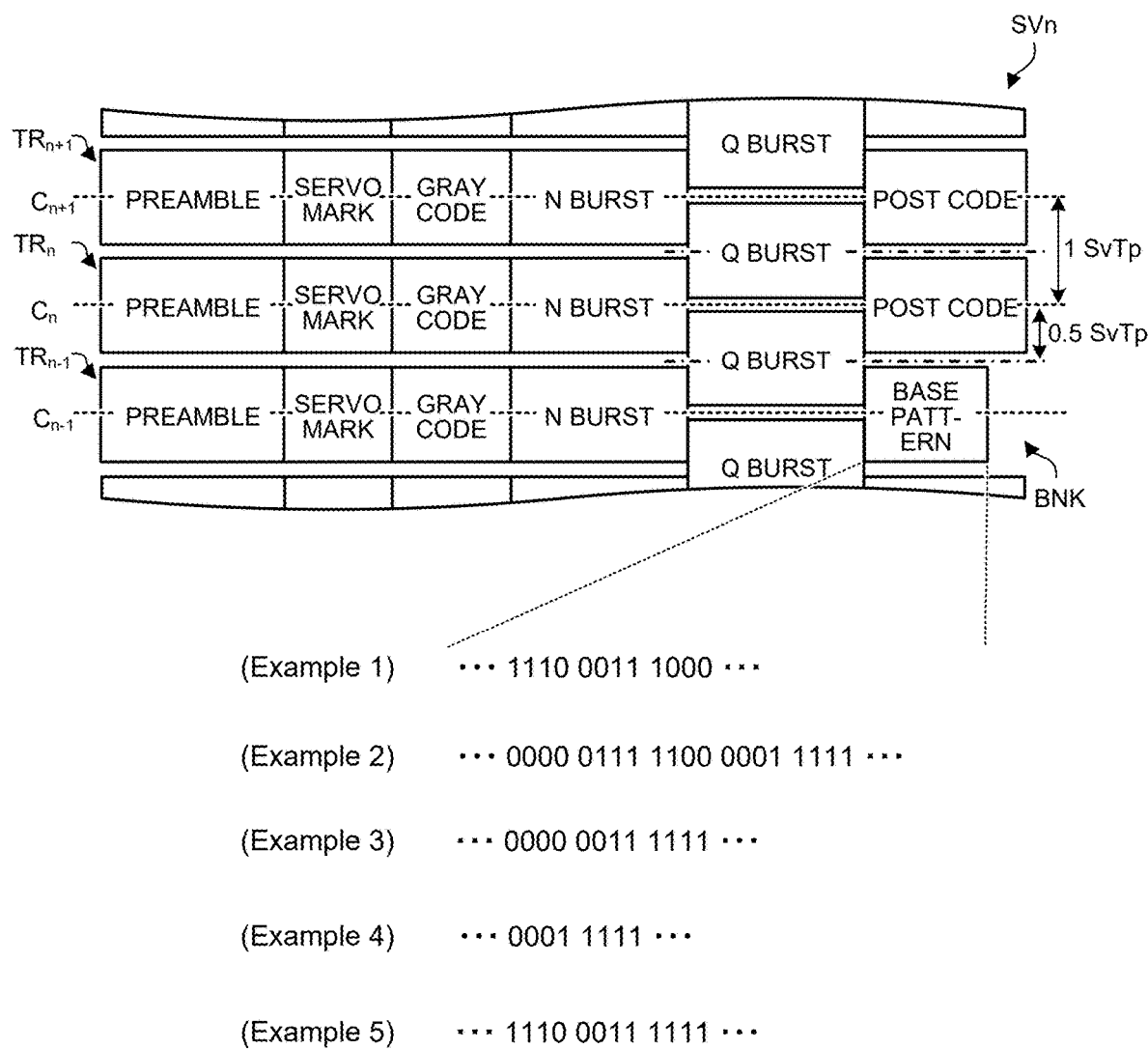
FIG. 5 is a diagram illustrating an example of a data pattern included in a base pattern of the magnetic disk according to the embodiment.

FIG. 5 is a diagram illustrating an example of a data pattern included in a base pattern of the magnetic disk 10 according to the embodiment.

Example 1 of FIG. 5 is an example of a case where a data pattern of a base pattern is configured by repeating data having a write length of 3 T of "000" and "111". Example 2 of FIG. 5 is an example of a case where a data pattern of a base pattern is configured by repeating data having a write length of 5 T of "00000" and "11111". Example 3 of FIG. 5 is an example of a case where a data pattern of a base pattern is configured by repeating data having a write length of 6 T of "000000" and "111111".

Note that data patterns in which the same data value is continuous, such as "00", "11", "0000", and "1111" included in the post code, or "000", "111", "00000", "11111", "000000", and "111111" included in the base pattern, are examples of sub-data patterns included in the base pattern. In addition, a write length such as 2 T, 3 T, 4 T . . . included in the sub-data pattern may also be referred to as a pattern length of the sub-data pattern.

As described above, the base pattern can be configured by combining sub-data patterns having write lengths other than 2 T or 4 T. As another example, the base pattern can be configured by combining sub-data patterns having write lengths other than 2 T or 4 T and different write lengths.

Example 4 of FIG. 5 is an example of a case where data having a write length of 8 T obtained by combining a sub-data pattern having a write length of 3 T of "000" and a sub-data pattern having a write length of 5 T of "11111" is set as one set, and a data pattern of a base pattern is configured by repeating this data set. Example 5 of FIG. 5 is an example of a case where data having a write length of 12 T obtained by combining a sub-data pattern having a write length of 3 T of "000" and "111" and a sub-data pattern having a write length of 6 T of "111111" is set as one set, and a data pattern of a base pattern is configured by repeating this data set.

By configuring the base pattern as described above, it is possible to obtain a base pattern having a data pattern that does not include any of the above-described sub-data patterns having 2 T or 4 T of "00", "11", "0000", and "1111" included in the post code.

Here, in order to improve the positioning accuracy of the magnetic head 12, the post code indicating the RRO correction amount is preferably written corresponding to the write position and the read position of all the data tracks.

However, in view of the manufacturing efficiency of the magnetic disk device 1, a post code may be written in association with, for example, only the write position out of the write position and the read position of the data track. In such a configuration, when the positioning of the read head of the magnetic head 12 is performed, the RRO correction amount of the magnetic head 12 may be controlled based on the post code written corresponding to the write position in the vicinity. This is because, at the time of data reading or the like, the read head of the magnetic head 12 is positioned at the read position, and the corresponding post code is not written at the read position.

For example, whether or not the post code at a predetermined write position can be read from the read position at the time of data reading or the like is determined by whether or not the read position at that time coincides with a predetermined write position on a data track different from the data track to which the read position belongs, or whether or not the read position and the write position are within a predetermined distance. When the read position and the write position coincide with each other or are within a predetermined distance, the MPU 60 determines that the post code of the write position to be determined can be read from the read position at that time.

As described above, the post code at a predetermined write position can be read at the time of reading, and this is due to the configuration of the magnetic head 12 and the driving operation of the arm 13 on which the magnetic head 12 is mounted.

Figure 6:
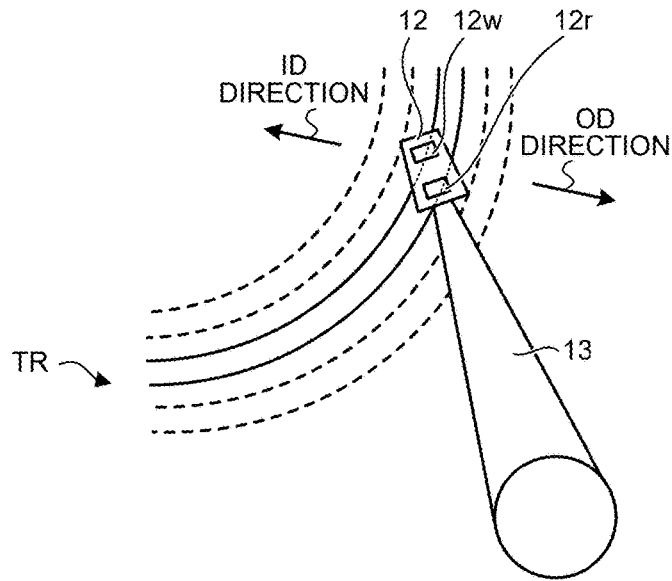
FIG. 6 is a schematic diagram describing a positional relationship between a write head and a read head of the magnetic head according to the embodiment.

FIG. 6 is a schematic diagram describing a positional relationship between a write head 12w and a read head 12r of the magnetic head 12 according to the embodiment.

As illustrated in FIG. 6, the write head 12w and the read head 12r of the magnetic head 12 are provided in the magnetic head 12 and are separated from each other, for example, in a direction along the extending direction of the arm 13. In addition, the magnetic head 12 is moved to a desired read position or write position by rotational driving of the arm 13.

As a result, the write head 12w and the read head 12r can be arranged on different tracks TR according to the rotation angle of the arm 13, that is, according to the radial position at the movement destination of the magnetic head 12. Accordingly, when the read head 12r is at a predetermined read position of the predetermined track TR, the write head 12w can be arranged at a predetermined write position of another track TR. At this time, there may be a case where a post code corresponding to a predetermined write position of another track TR can be read by the read head 12r at a predetermined read position.

As described above, in a case where there is a readable post code at the time of data reading or the like, the RRO correction amount is read from the post code and used to correct the read position of the magnetic head 12, so that the positioning accuracy of the magnetic head 12 at the time of reading in the magnetic disk device 1 can be improved.

However, as described above, there is a case where a post code is not written in the servo region SVn and there is a portion where the base pattern remains, such as an invalid track, among the plurality of tracks TR. Accordingly, even in a case where there is a region used for writing a post code in a readable range from a read position at the time of data reading or the like, it is necessary to determine whether a post code is written on the region or the region is a base pattern that remains without a post code being written.

(Example of Operation of Determining Post Code)

Next, with reference to FIGS. 7 to 9, an operation performed to determine a post code and a base pattern in the magnetic disk device 1 according to the embodiment will be described. Note that, in the following description, a region that is used for writing a post code and is in a readable range from a read position at the time of data reading or the like is referred to as a determination target region.

The MPU 60 first acquires the read waveform of the determination target region. The read waveform acquisition timing at this time is illustrated in FIG. 7.

Figure 7:
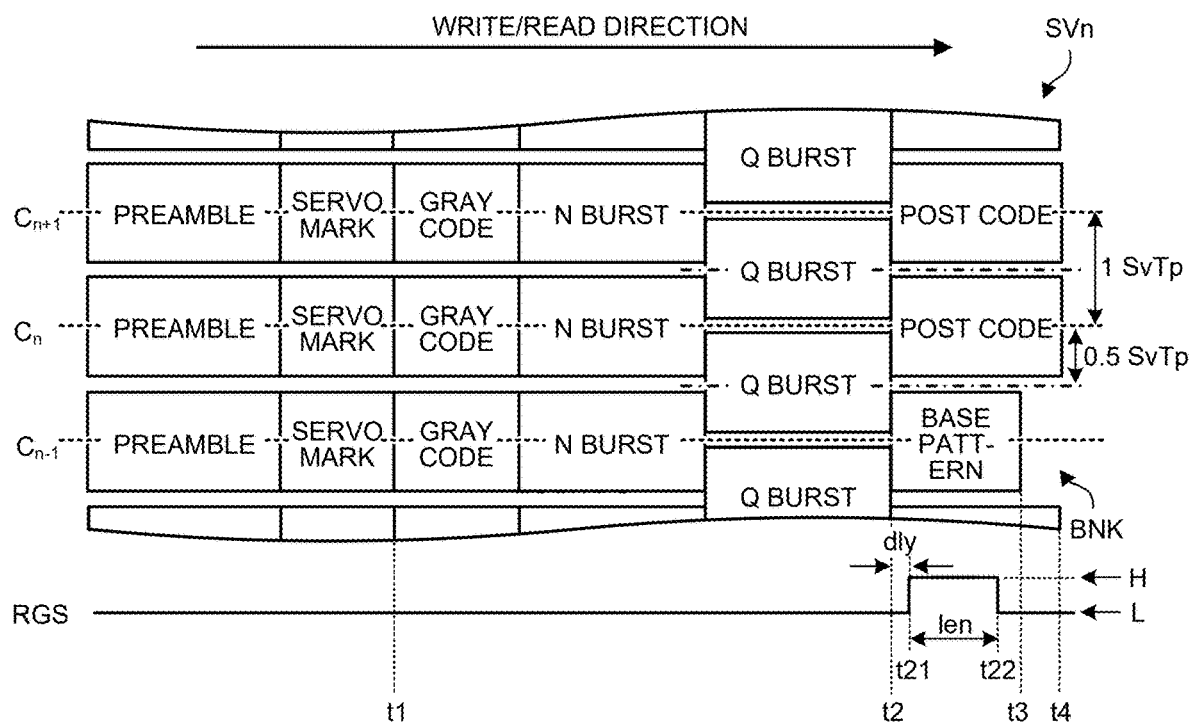
FIG. 7 is a schematic diagram illustrating timing of acquiring a read waveform of a determination target region by the magnetic disk device according to the embodiment.

FIG. 7 is a schematic diagram illustrating timing of acquiring a read waveform of a determination target region by the magnetic disk device 1 according to the embodiment.

As illustrated in FIG. 7, when acquiring the read waveform of the determination target region, the MPU 60 transmits a read gate signal RGS instructing start timing and end timing of the read operation to the R/W channel 40. The R/W channel 40 starts reading when the read gate signal RGS becomes "H" level, and ends reading when the read gate signal RGS becomes "L" level. In addition, while the read gate signal RGS is "H" level, the read waveform is sampled at the fundamental frequency (FreqRWC) interval described above.

In addition, in the servo region SVn including the determination target region, the magnetic head 12 moving in the write/read direction passes through the end position of the servo mark at time t1 and passes through the start position of the determination target region at time t2. In addition, in a case where a post code is written in the determination target region, the magnetic head 12 passes through the end position of the post code at time t4.

In addition, as illustrated in the example of FIG. 7, in a case where the end position of the base pattern is before the end position of the post code in the write/read direction and the base pattern is written in the determination target region, the magnetic head 12 is assumed to pass through the end position of the base pattern at time t3 before time t4.

In this case, even if the determination target region is either the post code or the base pattern, a read waveform of a part of the post code or a read waveform of a part or the whole of the base pattern can be acquired in the range from time t2 to time t3.

In the example of FIG. 7, it is set such that, within the range from time t2 to time t3, the read gate signal RGS becomes "H" level at time t21 delayed by a dly time from time t2 and the reading is started, and the read gate signal RGS becomes "L" level at time t22 at which len time has elapsed from time t21 and the reading ends. At this time, by appropriately adjusting the dly time and the len time, it is possible to acquire the read waveform in an arbitrary region of the post code or the base pattern and to improve the accuracy of determining the post code and the base pattern.

Note that the acquisition timing of the read waveform in the determination target region can be set separately from the acquisition timing of the read waveform when the RRO correction amount is read from the post code.

Figure 8A:
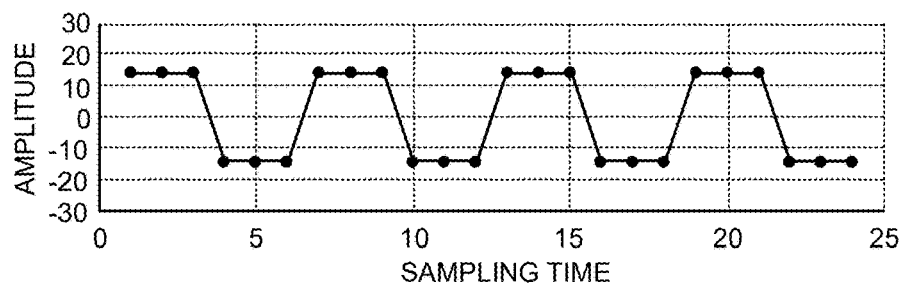
FIGS. 8A to 8C are graphs illustrating examples of various read waveforms of the magnetic disk according to the embodiment.
Figure 8B:
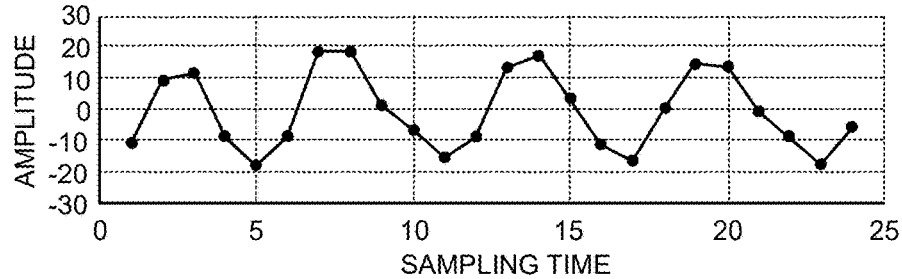
Figure 8C:
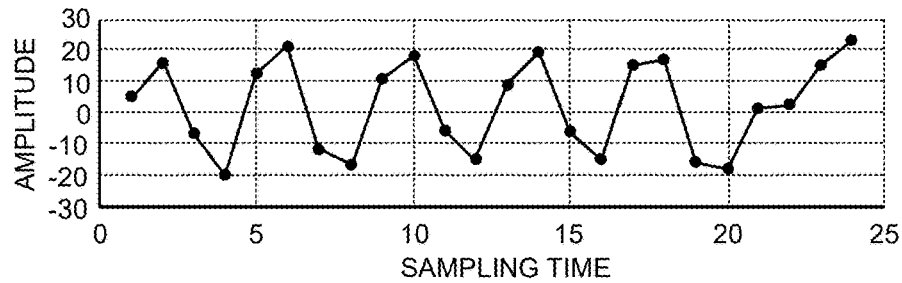

FIGS. 8A to 8C illustrate the read waveform acquired as described above in a case where the post code is written in the determination target region and the read waveform in the case of the base pattern together with the theoretical waveform of the base pattern.

FIGS. 8A to 8C are graphs illustrating examples of various read waveforms of the magnetic disk 10 according to the embodiment.

More specifically, FIG. 8A illustrates a theoretical waveform of the data pattern to be written as the base pattern, FIG. 8B illustrates a partial extraction of the read waveform of the base pattern that remains without overwritten by the post code, and FIG. 8C illustrates a partial extraction of the read waveform of the post code overwritten on the base pattern. The horizontal axis of each graph represents the sampling time, and the vertical axis represents the amplitude of each waveform. The amplitude on the vertical axis is a negative value when a region where "0" is written is read, and is a positive value when a region where "1" is written is read.

Note that each waveform in FIGS. 8A and 8B is an example in a case where the base pattern has a data pattern with a repetition of "000" and "111".

As illustrated in FIG. 8A, the base pattern having the data pattern having a repetition of the data having a write length of 3 T theoretically has a waveform in which a maximum and a minimum repeat at a constant cycle.

As illustrated in FIG. 8B, the read waveform of the base pattern actually written on the magnetic disk 10 has a waveform similar to the waveform of FIG. 8A although the regularity is slightly lost as compared with FIG. 8A.

As described above, the read waveform of the actually written base pattern is slightly different from the theoretical waveform of the base pattern due to the effect of the quality of the magnetic disk 10, the write accuracy or the read accuracy of the magnetic head 12, and the like.

As illustrated in FIG. 8C, the post code written on the magnetic disk 10 also has a plurality of variations in value of the amplitude, unlike the waveform of FIG. 8A having only the amplitude of two values of the maximum value and the minimum value, for example. However, even if this point is taken into consideration, since the post code has a data pattern in which "00", "11", "0000", and "1111" that are not included in the base pattern are arbitrarily combined, the read waveform of the post code illustrated in FIG. 8C is not similar to any waveform of FIGS. 8A and 8B.

In order to more quantitatively compare the waveforms of FIGS. 8A to 8C, for example, a correlation coefficient between the waveform of FIG. 8A and the waveform of FIG. 8B and a correlation coefficient between the waveform of FIG. 8A and the waveform of FIG. 8C are calculated, and the calculation results of these correlation coefficients can be referred to.

There are various types of correlation coefficients, but here, a method for calculating the correlation coefficient is not particularly limited. As an example, a calculation formula of a Pearson's product-moment correlation coefficient is expressed by Formula (1) described below.

[Math. 1]

$$r = \frac{\text{Covariance of variable } x \text{ and variable } y}{\text{Standard deviation variable } x \times \text{Standard deviation of variable } y} \quad (1)$$

$$= \frac{\frac{1}{n}\sum_{i=1}^{n}(x_i - \bar{x})(y_i - \bar{y})}{\sqrt{\frac{1}{n}\sum_{i=1}^{n}(x_i - \bar{x})}\sqrt{\frac{1}{n}\sum_{i=1}^{n}(y_i - \bar{y})}}$$

$n$: Total number of data $x_i$: Value of $i$-th $x$ $y_i$: Value of $i$-th $y$ $\bar{x}$: Average value of $x$ $\bar{y}$: Average value of $y$ The correlation coefficient between the waveform of FIG. 8A and the waveform of FIG. 8B is calculated based on Formula (1) described below, for example, in a case where the waveform of FIG. 8A is represented by a variable x and the waveform of FIG. 8B is represented by a variable y.

The correlation coefficient between the waveform of FIG. 8A and the waveform of FIG. 8C is calculated based on Formula (1) described below, for example, in a case where the waveform of FIG. 8A is represented by a variable x and the waveform of FIG. 8C is represented by a variable y.

The calculated values of the various correlation coefficients including the Pearson's product-moment correlation coefficient take values in a range of −1 to +1. As the correlation coefficient is closer to −1, there is a stronger negative correlation, and as the correlation coefficient is closer to +1, there is a stronger positive correlation. In addition, as the correlation coefficient is closer to 0, it means that there is no correlation between the two variables x and y.

Figure 9:
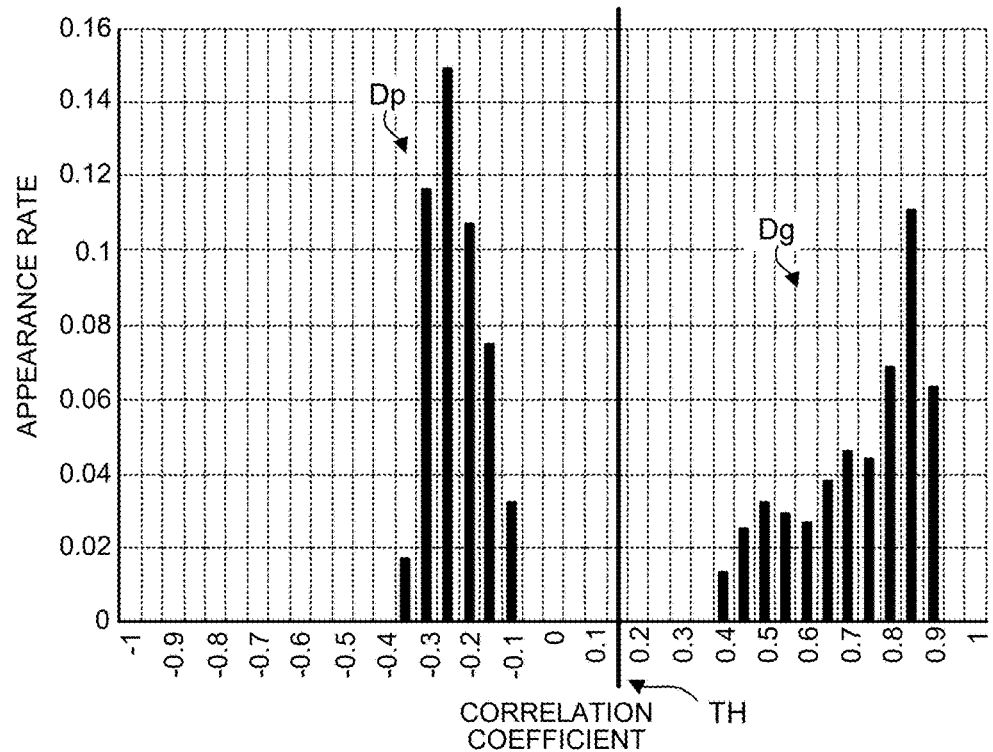
FIG. 9 is a graph illustrating a distribution of correlation coefficients obtained from a read waveform of a post code written on the magnetic disk or a read waveform of a base pattern according to the embodiment.

FIG. 9 is a graph illustrating a distribution of correlation coefficients obtained from a read waveform of a post code written on the servo region SVn of the magnetic disk 10 or read from a base pattern according to the embodiment.

The horizontal axis of the graph of FIG. 9 is a correlation coefficient, and the vertical axis is an appearance rate of a theoretical base pattern in a read waveform of a post code or a base pattern. In addition, a data group Dp plotted on the left side of the graph is data based on the read waveform of the post code, and a data group Dg plotted on the right side of the graph is data based on the read waveform of the base pattern.

More specifically, the appearance rate of the base pattern in the read waveform of the post code is the number of times of appearance of the data pattern matching the theoretical waveform of the base pattern among the read waveforms acquired a plurality of times with respect to the post code written on the magnetic disk 10. Similarly, the appearance rate of the base pattern in the read waveform of the base pattern is the number of times of appearance of the data pattern matching the theoretical waveform of the base pattern among the read waveforms acquired a plurality of times with respect to the base pattern written on the magnetic disk 10.

That is, for example, it is assumed that the number of data of the read waveform having the correlation coefficient of −0.1 among the read waveforms acquired a plurality of times for the post code is 1000, and the appearance rate at that time is 0.032. In this case, it means that the data pattern matching the theoretical waveform of the base pattern appeared 32 times among the 1000 read waveforms of the post code the correlation coefficient of which indicated −0.1.

In addition, for example, it is assumed that the number of data of the read waveform having the correlation coefficient of 0.7 among the read waveforms acquired a plurality of times for the base pattern is 1000, and the appearance rate at that time is 0.046. In this case, it means that the data pattern matching the theoretical waveform of the base pattern appeared 46 times among the 1000 read waveforms of the base pattern the correlation coefficient of which indicated 0.7.

As illustrated in FIG. 9, when looking at the calculation result of the correlation coefficient based on the above, all the data groups Dp based on the read waveform of the post code are distributed at positions where the correlation coefficient is less than 0 and is close to the correlation coefficient 0. From this, it can be said that the read waveform of the post code has almost no correlation with the theoretical waveform of the base pattern.

On the other hand, all the data groups Dg based on the read waveform of the base pattern are distributed at positions where the correlation coefficient exceeds 0 and is close to the correlation coefficient +1. From this, it can be said that the read waveform of the base pattern written on the magnetic disk 10 has a positive correlation with the theoretical waveform of the base pattern.

In addition, since the distribution of the data groups Dp and the distribution of the data groups Dg are separated from each other without overlapping with each other, it can be seen that it can be determined whether it is the post code or the base pattern written in the determination target region based on the read waveform of the determination target region acquired as described above.

More specifically, at the time of manufacturing the magnetic disk device 1, the read waveform of the base pattern before overwritten by the post code and the read waveform of the post code after the overwrite are acquired in advance from the magnetic disk 10. In addition, a correlation coefficient based on these read waveforms can be calculated, and a threshold serving as a reference for the determination can be set based on the distribution of the data groups Dp based on the read waveform of the post code and the distribution of the data groups Dg based on the read waveform of the base pattern. The set threshold is stored in the MPU 60 or the like of the magnetic disk device 1, for example.

At this time, in a case where the magnetic disk device 1 includes a plurality of magnetic disks 10, the above measurement is performed on one or more magnetic disks 10 arbitrarily picked up among the magnetic disks 10, and the threshold can be set for each magnetic disk device 1. Alternatively, the above measurement may be performed for all the magnetic disks 10 included in one magnetic disk device 1, and in that case, the threshold may be set for each individual magnetic disk 10.

In reading the predetermined data, when the determination is performed on the determination target region readable from the read position, the MPU 60 acquires the read waveform of the determination target region at the read timing in FIG. 7 described above, for example, calculates the correlation coefficient with the theoretical waveform of the base pattern, and performs the determination regarding the determination target region based on the threshold set in advance.

In the example of the graph of FIG. 9, for example, a threshold TH can be set to 0.15 or the like, and in this case, when the correlation coefficient based on the read waveform of the determination target region is less than 0.15, it can be determined that the post code is written in the determination target region. On the other hand, when the correlation coefficient based on the read waveform of the determination target region is 0.15 or more, it can be determined that what is written in the determination target region is the base pattern and not the post code.

(Example of Post Code Determination Processing)

Figure 10:
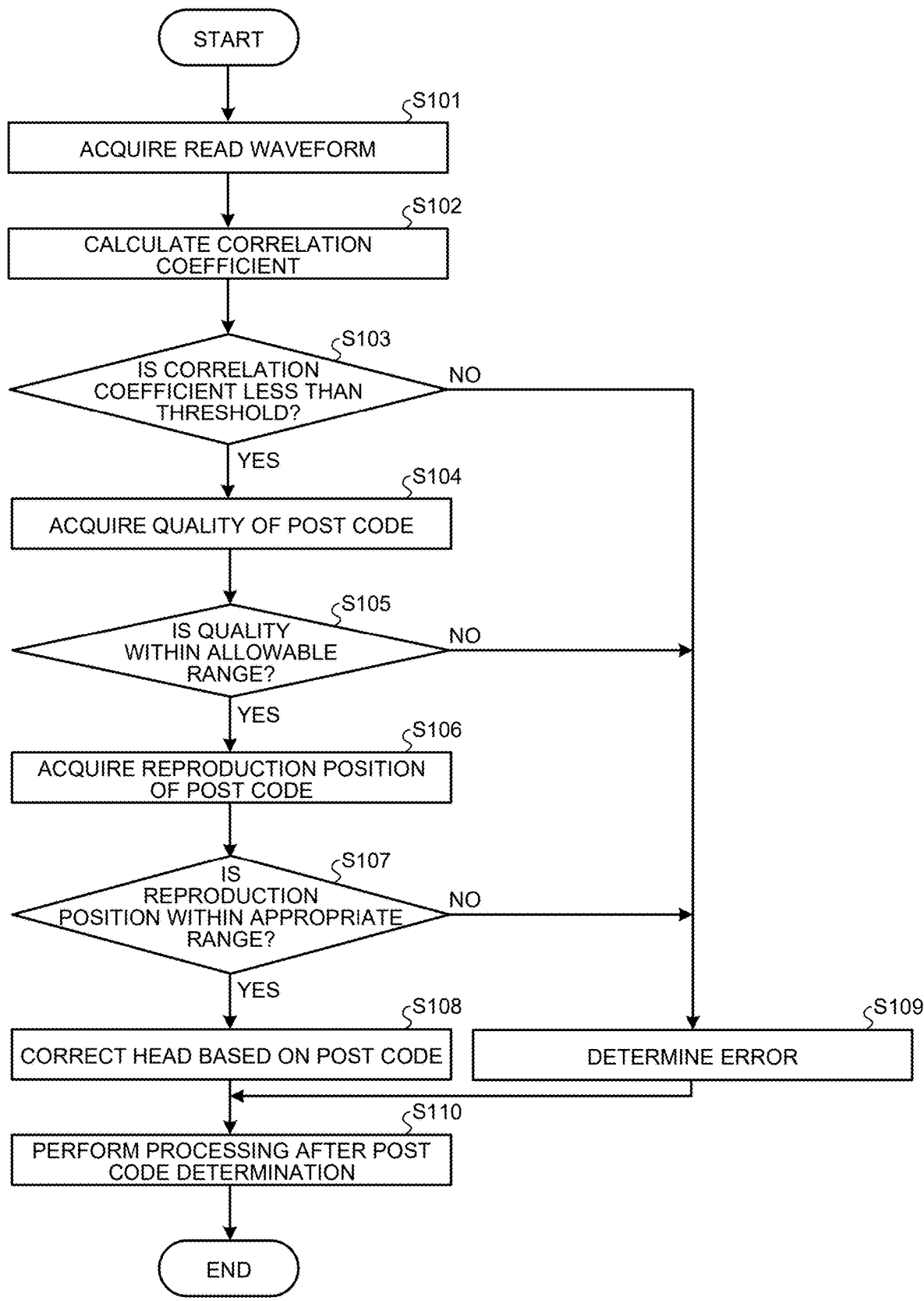
FIG. 10 is a flowchart illustrating an example of procedures of post code determination processing and error determination processing by the magnetic disk device according to the embodiment.

Next, an example of post code determination processing and error determination processing in the magnetic disk device 1 according to the embodiment will be described with reference to FIG. 10. FIG. 10 is a flowchart illustrating an example of procedures of post code determination processing and error determination processing by the magnetic disk device 1 according to the embodiment.

As illustrated in FIG. 10, the MPU 60 causes the R/W channel 40 to acquire the read waveform of the determination target region (step S101). The MPU 60 calculates a correlation coefficient between the read waveform of the determination target region and the theoretical waveform of the base pattern (step S102). The MPU 60 determines whether the calculated correlation coefficient is less than the threshold set in advance (step S103).

When the correlation coefficient based on the read waveform is less than the threshold (step S103: Yes), it can be said that the post code is written in the determination target region. Therefore, the MPU 60 acquires data regarding the quality of the post code (step S104). Examples of the quality data of the post code include a detection result of a Sync mark indicating the start position of servo data such as a post code, and an error determination result based on a parity bit for error detection added to the servo data including the post code.

The MPU 60 determines the quality of the post code based on the acquired quality data of the post code (step S105).

When the quality of the post code is within an allowable range (step S105: Yes), the MPU 60 acquires the reproduction position of the post code (step S106). The MPU 60 calculates the reproduction position of the post code based on the distance between the current position of the magnetic head 12 moved to the read position of the read target portion of the magnetic disk 10 and the position of the post code to be determined. The current position of the magnetic head 12 can be obtained by reading the servo data corresponding to the read position at that time.

The MPU 60 determines whether or not the reproduction position of the acquired post code is within an appropriate range (step S107). At this time, when the distance between the current position of the magnetic head 12 and the post code is within the distance in which the post code can be read, it is determined that the reproduction position of the post code is within the appropriate range, and when the distance exceeds the distance in which the post code can be read, it is determined that the reproduction position of the post code is not within the appropriate range.

When the reproduction position of the post code is within the appropriate range (step S107: Yes), the MPU 60 corrects the read head position of the magnetic head 12 based on the RRO correction amount read from the post code (step S108), and then performs processing after the post code determination (step S110). The processing after the post code determination is, for example, data read processing for desired data.

In any of a case where the correlation coefficient calculated from the read waveform of the determination target region is equal to or larger than the threshold (step S103: No), a case where the quality of the post code is not within the allowable range (step S105: No), and a case where the reproduction position of the post code is not within the appropriate range (step S107: No), the MPU 60 makes an error determination (step S109). In this case, since there is no post code available for the read position correction of the magnetic head 12, the processing after the post code determination is performed without performing the read head position correction of the magnetic head 12 (step S110). The processing after the post code determination is, for example, data read processing for desired data.

As described above, the post code determination processing and error determination processing by the magnetic disk device 1 according to the embodiment are ended.

(Method for Manufacturing Magnetic Disk Device)

Figure 11A:
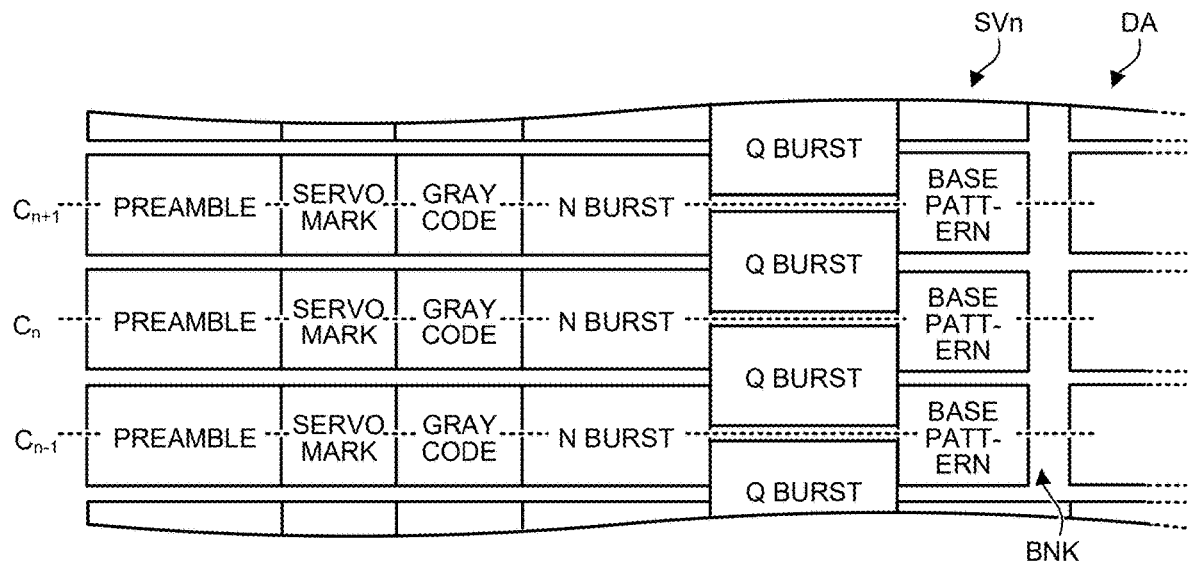
FIGS. 11A and 11B are schematic diagrams illustrating an example of a method for manufacturing the magnetic disk device according to the embodiment.
Figure 11B:
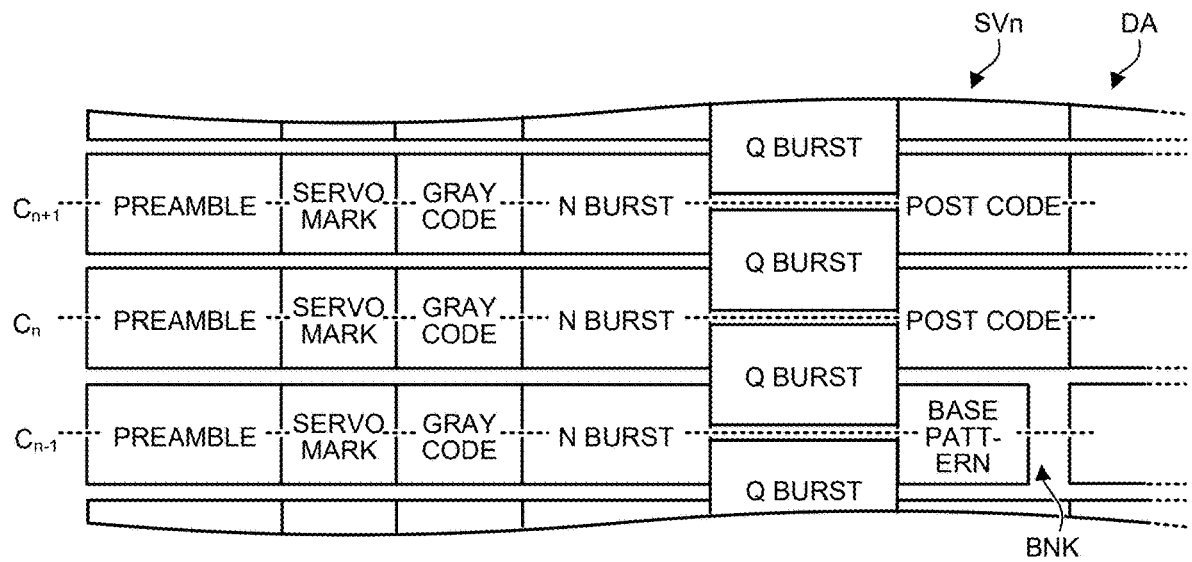

Next, a method for manufacturing the magnetic disk device 1 will be described with reference to FIGS. 11A and 11B. FIGS. 11A and 11B are schematic diagrams illustrating an example of a method for manufacturing the magnetic disk device 1 according to the embodiment.

Note that the method for manufacturing the magnetic disk device 1 includes processing of writing various types of information such as servo data to the magnetic disk 10. In the following description, the above-described write processing to the magnetic disk 10 in the method for manufacturing the magnetic disk device 1 will be mainly described.

Writing of various types of information including the servo data into the magnetic disk 10 is performed, for example, after the magnetic disk device 1 is assembled.

As illustrated in FIG. 11A, first, the servo data excluding a post code, such as a preamble, a servo mark, a gray code, an N burst, and a Q burst, is written in the servo region SVn of the magnetic disk 10. In addition, the base pattern is written in a region that is used for writing a post code.

That is, the preamble, the servo mark, the gray code, the N burst, the Q burst, and the base pattern are written in this order in the write/read direction on the magnetic disk 10.

As described above, the base pattern is written in a range from the start position of the region that is used for writing a post code to the length of the region or less. When the length of the base pattern is shorter than the length of the region that is used for writing a post code, the region after the end of the base pattern may be the blank region BNK.

Note that servo data such as an N burst and a Q burst is also written in the servo region SVs of the magnetic disk 10 at the same timing as the servo region SVn. In a case where an additional pattern for detecting a deviation in demodulation timing is added to the servo data of the servo region SVs as described above, a data pattern similar to the above-described base pattern may be written in a region that is used for writing an additional pattern. Alternatively, the base pattern written in the servo region SVs may be different from the data pattern of the base pattern written in the servo region SVn. In addition, the data pattern written in the servo region SVs may include a preamble, a servo mark, and a gray code written in the servo region SVn.

After the servo data and the like are written, the RRO correction amount is learned. In the learning of the RRO correction amount, predetermined tracks are sequentially set as target tracks for each track in a predetermined range, and a difference between the actual radial position of the magnetic head 12 and the radial position of the target track is measured for each target track under positioning control based on a gray code, an N burst, and a Q burst.

That is, the MPU 60 reads the gray code, the N burst, and the Q burst already written in the servo region SVn, and estimates the position of the magnetic head 12 based on the read results. In addition, the MPU 60 positions the magnetic head 12 on the target track based on the estimated position of the magnetic head 12. Meanwhile, the MPU 60 acquires the deviation amount of the estimated position of the magnetic head 12 from the target track as the RRO correction amount.

As illustrated in FIG. 11B, the MPU 60 writes the RRO correction amount acquired as described above in the post code region of the servo region SVn in at least some tracks out of the plurality of tracks included in the magnetic disk 10. At this time, the base pattern is overwritten in the track where the post code is written. In addition, in a track that is not a write target due to being recognized as an invalid track, a post code is not written, and thus the base pattern remains in the servo region SVn.

Note that, in at least one magnetic disk 10 among the magnetic disks 10 incorporated in the magnetic disk device 1, the read waveform of the base pattern and the read waveform of the post code are acquired before and after writing the post code in the servo region SVn, and a threshold used for determining the post code and the base pattern is set.

Thus, the magnetic disk device 1 of the embodiment is manufactured.

(Overview)

In the magnetic disk device, a post code having information of the RRO correction amount may be written in association with only the write position out of the write position and the read position of the data track of the magnetic disk. In such a magnetic disk device, at the time of data reading or the like, a post code corresponding to a predetermined write position may be used for correction of the read position of the magnetic head. However, at this time, there is a possibility that the read result of the servo region in which the post code is not written is erroneously recognized as data read from the post code.

Here, when the post code corresponding to a predetermined write position is used at the time of data reading or the like, for example, it is determined whether the quality of the post code is within an allowable range or whether the reproduction position of the post code is within an appropriate range.

However, even if the reproduction position of the post code is within the appropriate range, it is not possible to determine whether or not the read result to be used for the correction of the read position of the magnetic head is data read from the post code in the first place. In addition, at the time of quality evaluation of the post code, even in a servo region in which the post code is not written, there may be a case where some signal is erroneously determined to be a detection signal of a Sync mark. Even when a parity bit is added to servo data, not all errors can be detected, for example, an odd number of data bits garbled can be detected, but an even number of data bits garbled cannot be detected. When the information amount of error detection parity bits is increased in order to enhance the detection accuracy of the error included in the servo data, the amount of user data that can be recorded in the data region DA decreases.

With the magnetic disk device 1 of the embodiment, the plurality of servo regions SVn includes, for each of the plurality of tracks, one of the servo region SVn in which a data pattern indicating a post code is written and a servo region SVn in which a base pattern having a data pattern different from the data pattern of the post code is written.

As described above, the base pattern written in the predetermined servo region SVn is written in advance before writing the post code, and the base pattern remains without the post code being written. As described above, by writing in advance a base pattern having a data pattern different from the data pattern of the post code, it is possible to determine whether the post code or the base pattern is written in the predetermined servo region SVn.

As a result, it is possible to prevent the base pattern from being erroneously recognized as the post code, and it is possible to determine a read error of the post code with high accuracy. In addition, in addition to the quality and reproduction position of the post code, evaluation is performed by determining the post code and the base pattern, so that the allowable range of the reproduction position of the post code can be extended. Therefore, the frequency at which the position of the magnetic head 12 can be corrected at the time of data reading or the like can be increased, and the positioning accuracy of the magnetic head 12 can be increased.

With the magnetic disk device 1 of the embodiment, the base pattern has a sub-data pattern different from the sub-data pattern of the post code. As a result, the data pattern of the base pattern can be made different from the data pattern of the post code so that determination of the post code or the base pattern can be made.

With the magnetic disk device 1 of the embodiment, the MPU 60 determines the matching degree between the read waveform of the determination target region and the read waveform of the base pattern based on the correlation coefficient between the read waveform of the determination target region and the read waveform of the base pattern. In this way, by performing the evaluation using the correlation coefficient, the matching degree of these read waveforms can be quantitatively determined, and the determination accuracy can be improved.

Note that, in the above-described embodiment, the correlation coefficient between the read waveform of the determination target region and the theoretical waveform of the base pattern is calculated, and it is determined whether or not the post code is written in the determination target region. However, for the read waveform in the determination target region, for example, a correlation coefficient with the read waveform of the base pattern actually written on the magnetic disk 10 may be calculated to perform the above determination.

In this case, the read waveform of the base pattern can be acquired in advance at the time of manufacturing the magnetic disk device 1, for example. In addition, the threshold used for the above determination can also be set based on, for example, a correlation coefficient between the read waveform of the post code and the read waveform of the base pattern acquired at the time of manufacturing the magnetic disk device 1.

The correlation coefficient between the read waveform of the post code and the read waveform of the base pattern is also considered to be a value close to 0 similarly to the data groups Dp illustrated in the graph of FIG. 9 described above. In addition, in this case, it is considered that a value with higher determination accuracy can be set as the threshold used for determination.

(Modification)

Next, a magnetic disk device according to a modification of the embodiment will be described with reference to FIG. 12. In the magnetic disk device of the modification, a method of determining a post code and a base pattern is different from that of the above-described embodiment.

More specifically, in the magnetic disk device of the modification, the post code and the base pattern are determined using discrete Fourier transform (DFT). That is, in the modification, the discrete Fourier transform is used to calculate the frequency component of a specific frequency included in the read waveform (read data).

The discrete Fourier transform is a method of converting data having no periodicity into a sum of trigonometric functions. The general Fourier transform is used for analog data, whereas the discrete Fourier transform can be used for digital data.

By the discrete Fourier transform, target data can be decomposed into different frequency components such as sine waves and cosine waves. After the discrete Fourier transform, for example, it is assumed that an arbitrary read waveform of the post code or the base pattern is represented by function f(x) with the variable x described below.

$$f(x) = A1 \sin(f1x) + A2 \sin(f2x) + A3 \sin(f3x)$$

In the function f(x), f1, f2, f3 . . . are frequencies of sine waves included in the arbitrary read waveform, and sin (f1x), sin (f2x), sin (f3x) . . . are frequency components of sine waves included in the arbitrary read waveform. In addition, A1, A2, A3, . . . are individual magnitudes of the frequency components of sine waves included in the arbitrary read waveform. Assuming that the theoretical base pattern is a sine wave having frequency f2, by calculating a frequency component of sine waves included in the arbitrary read waveform by discrete Fourier transform, it is found that the magnitude of the frequency component of the theoretical base pattern that is a sine wave that is included in the arbitrary read waveform and has, for example, frequency f2 is A2.

Figure 12:
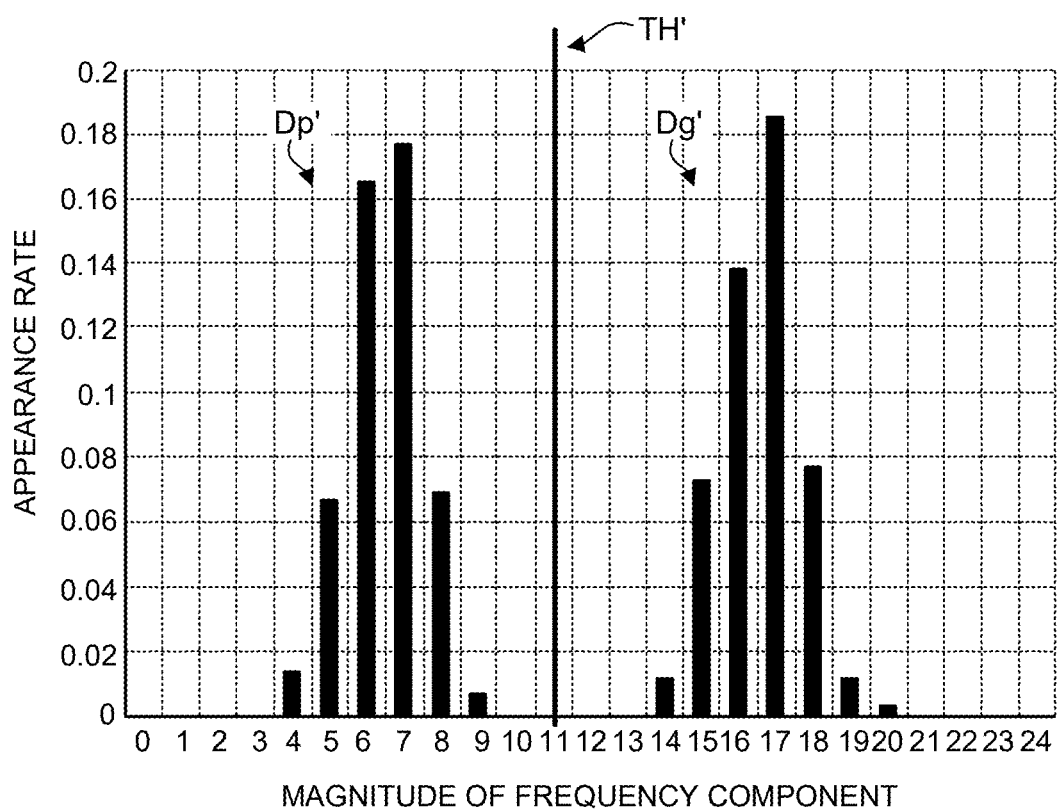
FIG. 12 is a graph illustrating a distribution of frequency components obtained by discrete Fourier transform from a read waveform of a post code written on the magnetic disk or a read waveform of a base pattern according to the embodiment.

FIG. 12 is a graph illustrating a distribution of frequency components obtained by discrete Fourier transform from a read waveform of a post code written on the magnetic disk or a read waveform of a base pattern according to the embodiment. That is, the graph of FIG. 12 illustrates the distribution of the frequency components of the theoretical base pattern included in the read waveform of the post code or the read waveform of the base pattern calculated by performing discrete Fourier transform on the read waveform of the post code or the read waveform of the base pattern.

The horizontal axis of the graph in FIG. 12 represents the magnitude of the frequency component of the theoretical base pattern included in the read waveform of the post code or the base pattern, that is, a value corresponding to the coefficient of an individual frequency component of A1, A2, A3 . . . in terms of the function f(x) described above. The vertical axis of the graph is an appearance rate of the theoretical base pattern in the read waveform of the post code or the base pattern.

In addition, a data group Dp' plotted on the left side of the graph is data based on the read waveform of the post code, and a data group Dg' plotted on the right side of the graph is data based on the read waveform of the post code.

That is, for example, it is assumed that the appearance rate of the base pattern is 0.067 in a case where the magnitude of the frequency component of the theoretical base pattern included in the read waveform of the post code among the read waveforms acquired a plurality of times for the post code is 5. At this time, for example, it means that there are 67 read waveforms in which the magnitude of the frequency component of the included theoretical base pattern was 5 among the 1000 read waveforms of the post code.

In addition, for example, it is assumed that the appearance rate of the base pattern is 0.073 in a case where the magnitude of the frequency component of the theoretical base pattern included in the read waveform of the post code among the read waveforms acquired a plurality of times for the base pattern is 15. At this time, for example, it means that there are 73 read waveforms in which the magnitude of the frequency component of the included theoretical base pattern was 15 among the 1000 read waveforms of the base pattern.

As illustrated in FIG. 12, looking at the calculation result of the frequency component based on the above, even in a case where the discrete Fourier transform is used instead of the correlation function of the above-described embodiment, the distribution of the data groups Dp' and the distribution of the data groups Dg' are separated from each other without overlapping each other. Accordingly, for example, it is possible to determine whether what is written in the determination target region is a post code or a base pattern by acquiring the read waveform of the determination target region and calculating the frequency component similarly to the above-described embodiment.

That is, similarly to the above-described embodiment, at the time of manufacturing the magnetic disk device, the read waveform of the base pattern before the post code is overwritten and the read waveform of the post code after the overwrite are acquired in advance from the magnetic disk, the frequency components included in the read waveforms are calculated by the discrete Fourier transform, and the threshold used for the determination of the determination target region can be set based on the distributions of the data groups Dp' and Dg' based on the read waveforms. In reading predetermined data, the above determination is made based on the preset threshold.

In the example of the graph of FIG. 12, for example, a threshold TH' can be set to 11 or the like, and in this case, when the magnitude of the frequency component of the theoretical base pattern included in the read waveform of the determination target region is less than 11, it can be determined that the post code is written in the determination target region. On the other hand, when the magnitude of the frequency component of the theoretical base pattern included in the read waveform of the determination target region is 11 or more, it can be determined that what is written in the determination target region is the base pattern and not the post code.

With the magnetic disk device of the modification, the matching degree between the read waveform of the determination target region and the read waveform of the base pattern is determined based on the frequency component of the base pattern included in the read waveform of the determination target region. In this way, even in a case where the frequency component is used, the matching degree of these read waveforms can be quantitatively determined, and the determination accuracy can be improved.

Here, as described in the above-described embodiment, for example, the data pattern of the base pattern can be configured by repeating a sub-data pattern having a predetermined write length, such as 3 T, 5 T, or 6 T. As in the above-described modification, in the determination of the post code using the frequency component, it is desirable to use the base pattern in which a sub-data pattern having a single write length is repeated as described above. This is because frequency components indicating the base pattern can be narrowed down to one among a plurality of frequency components included in the function f(x).

In addition, since the base pattern in which a sub-data pattern having a single write length is repeated tends to have a shorter repeating unit than the base pattern in which sub-data patterns having a plurality of write lengths are combined, there is also an advantage that an error of data included in the base pattern can be reduced.

Note that, in a case where a base pattern in which sub-data patterns having a plurality of write lengths are combined is used, a plurality of frequency components included in the function f(x) is specified as frequency components that mean the base pattern.

On the other hand, by combining sub-data patterns having a plurality of write lengths to form a base pattern, an arbitrary base pattern can be selected from various variations. At this time, for example, as in the above-described embodiment, if the post code is determined using the correlation coefficient instead of the frequency component, there is no need to specify a plurality of frequency components meaning the base pattern from the function f(x).

Additionally, the determination of the post code is not limited to the methods of the embodiment and the modification described above, and various methods can be adopted, and a suitable base pattern can be selected according to the adopted method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk including a plurality of tracks;

a magnetic head that performs data reading and data writing on the magnetic disk;

a plurality of servo regions that is provided in each of the plurality of tracks, and at least partially includes a first physical pattern, the first physical pattern being a physical pattern after writing of a first data pattern including position information of each of the plurality of tracks; and a controller that controls the magnetic head, wherein the plurality of servo regions includes one of a first servo region including the first physical pattern, and a second servo region including a second physical pattern, the second physical pattern being a physical pattern after writing of a second data pattern different from the first data pattern, for each of the plurality of tracks, and the controller performs determination as to which of the first and second physical patterns a third servo region has, the third servo region being one of a servo region among the plurality of servo regions included in the plurality of tracks.

2. The magnetic disk device according to claim 1, wherein each of the first data pattern and the second data pattern includes a plurality of sub-data patterns, each of the plurality of sub-data patterns has a pattern length that is an integral multiple of a pattern length represented by a reciprocal of a predetermined frequency, and among the plurality of sub-data patterns, a sub-data pattern included in the second data pattern is different from a sub-data pattern included in the first data pattern.

3. The magnetic disk device according to claim 2, wherein
the sub-data pattern is data pattern in which data of a same value of "0" or "1" is continuous,
the second data pattern is a repetitive pattern of
a first sub-data pattern in which "0" of a first pattern length is continuous, and
a second sub-data pattern in which "1" of a second pattern length is continuous, and
the first and second pattern lengths are different from any pattern length of the sub-data patterns included in the first data pattern.

4. The magnetic disk device according to claim 3, wherein the first pattern length and the second pattern length are equal to each other.

5. The magnetic disk device according to claim 3, wherein the first pattern length and the second pattern length are different from each other.

6. The magnetic disk device according to claim 1, wherein the controller performs the determination based on a matching degree between a third data pattern and the second data pattern, the third data pattern being obtained by reading a third physical pattern written in the third servo region.

7. The magnetic disk device according to claim 6, wherein the controller evaluates the matching degree based on a first correlation coefficient between the third data pattern and the second data pattern.

8. The magnetic disk device according to claim 7, wherein
the controller determines that the third servo region has the first physical pattern when the first correlation coefficient is less than a first threshold set in advance based on a second correlation coefficient between the first data pattern and the second data pattern, and
the controller determines that the third servo region has the second physical pattern when the first correlation coefficient is equal to or larger than the first threshold.

9. The magnetic disk device according to claim 6, wherein the controller calculates a frequency component of the second data pattern included in the third data pattern by discrete Fourier transform and evaluates the matching degree.

10. The magnetic disk device according to claim 9, wherein
the controller determines that the third servo region has the first physical pattern when a magnitude of a frequency component included in the third data pattern is less than a second threshold set in advance based on a magnitude of the frequency component of the second data pattern included in the first data pattern, and
the controller determines that the third servo region has the second physical pattern when the magnitude of the frequency component included in the third data pattern is equal to or greater than the second threshold.

11. The magnetic disk device according to claim 1, wherein
the position information of each of the plurality of tracks includes correction information for correcting a position of the magnetic head, and
when it is determined that the third servo region has the first physical pattern, the controller corrects the position of the magnetic head based on the correction information included in a third data pattern obtained by reading a third physical pattern written in the third servo region.

12. A method for manufacturing a magnetic disk device, the method comprising:
in a plurality of servo regions used to write a first data pattern including position information of each of a plurality of tracks included in a magnetic disk, writing a second data pattern different from the first data pattern, the plurality of servo regions being provided in each of the plurality of tracks and to have a first physical pattern after writing of the first data pattern, the first physical pattern being a physical pattern after writing of the first data pattern;
overwriting the first data pattern on at least some of the plurality of servo regions including a second physical pattern that is a physical pattern after writing of the second data pattern;
acquiring a first read waveform obtained by reading the first physical pattern overwritten on the second physical pattern and a second read waveform obtained by reading the second physical pattern; and
based on the first and second read waveforms, setting a threshold used to determine which of the first and second physical patterns a predetermined servo region has, the predetermined servo region being one of a servo region among the plurality of servo regions included in the plurality of tracks.

13. The method for manufacturing a magnetic disk device according to claim 12, wherein
each of the first data pattern and the second data pattern includes a plurality of sub-data patterns,
each of the plurality of sub-data patterns has a pattern length that is an integral multiple of a pattern length represented by a reciprocal of a predetermined frequency, and
a sub-data pattern included in the second data pattern among the plurality of sub-data patterns is different from a sub-data pattern included in the first data pattern.

14. The method for manufacturing a magnetic disk device according to claim 13, wherein
the sub-data pattern is data pattern in which data of a same value of "0" or "1" is continuous,
the second data pattern is a repetitive pattern of
a first sub-data pattern in which "0" of a first pattern length is continuous, and
a second sub-data pattern in which "1" of a second pattern length is continuous, and
the first and second pattern lengths are different from any pattern length of the sub-data patterns included in the first data pattern.

15. The method for manufacturing a magnetic disk device according to claim 14, wherein
the first pattern length and the second pattern length are equal to each other.

16. The method for manufacturing a magnetic disk device according to claim 14, wherein
the first pattern length and the second pattern length are different from each other.

* * * * *